(12) United States Patent
Hattori et al.

(10) Patent No.: US 10,344,811 B2
(45) Date of Patent: Jul. 9, 2019

(54) VEHICLE CONTROLLING DEVICE

(71) Applicants:JATCO Ltd, Fuji-shi, Shizuoka (JP); NISSAN MOTOR CO., LTD., Yokohama-shi, Kanagawa (JP)

(72) Inventors: Kenji Hattori, Fujisawa (JP); Kouichi Kotsuji, Numazu (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 28 days.

(21) Appl. No.: 15/547,183

(22) PCT Filed: Dec. 16, 2015

(86) PCT No.: PCT/JP2015/085134
§ 371 (c)(1),
(2) Date: Jul. 28, 2017

(87) PCT Pub. No.: WO2016/121256
PCT Pub. Date: Aug. 4, 2016

(65) Prior Publication Data
US 2018/0023639 A1    Jan. 25, 2018

(30) Foreign Application Priority Data

Jan. 30, 2015  (JP) ................................ 2015-016356

(51) Int. Cl.
*F16H 61/04*  (2006.01)
*F16D 48/06*  (2006.01)
(Continued)

(52) U.S. Cl.
CPC .............. *F16D 48/06* (2013.01); *B60K 6/387* (2013.01); *B60L 15/20* (2013.01); *B60W 20/50* (2013.01);
(Continued)

(58) Field of Classification Search
None
See application file for complete search history.

(56) References Cited

U.S. PATENT DOCUMENTS 5,871,419 A * 2/1999 Amendt ................ F16D 48/066
477/180
2012/0108388 A1  5/2012 Akebono et al.
(Continued)

FOREIGN PATENT DOCUMENTS

EP       2 447 561 A2    5/2012
JP       2012-163117 A   8/2012

*Primary Examiner* — Justin Holmes
(74) *Attorney, Agent, or Firm* — Foley & Lardner LLP (57) ABSTRACT

A vehicle controlling device has a frictional engagement element provided between a drive motor and a driving wheel; a shifting unit capable of selecting a travel range or a non-travel range; first obtaining unit configured to, during selection of the travel range, obtain a first parameter including at least a first motor torque value that is a torque value of the drive motor; second obtaining unit configured to, during selection of the non-travel range, obtain a second parameter including at least a second motor torque value that is a torque value of the drive motor; and operating unit configured to, on the basis of the first and second parameters, calculate a zero point hydraulic pressure command value at which the frictional engagement element starts to generate a torque capacity. It is therefore possible to detect a zero point of a clutch between the drive motor and the driving wheel.

6 Claims, 4 Drawing Sheets

(51) Int. Cl.
    *B60L 15/20*     (2006.01)
    *B60K 6/387*     (2007.10)
    *B60W 20/50*     (2016.01)
    *B60W 50/00*     (2006.01)

(52) U.S. Cl.
    CPC ..... *F16H 61/04* (2013.01); *B60W 2050/0083* (2013.01); *B60W 2510/0275* (2013.01); *B60W 2510/0291* (2013.01); *B60W 2510/083* (2013.01); *B60W 2510/101* (2013.01); *B60Y 2200/92* (2013.01); *B60Y 2400/406* (2013.01); *B60Y 2400/424* (2013.01); *F16D 2500/30404* (2013.01); *Y02T 10/7258* (2013.01); *Y10S 903/914* (2013.01)

(56) References Cited

U.S. PATENT DOCUMENTS

| | | |
|---|---|---|
| 2012/0203406 A1 | 8/2012 | Akebono et al. |
| 2013/0297191 A1* | 11/2013 | Gibson ............... F02N 11/0855 |
| | | 701/112 |
| 2014/0045649 A1 | 2/2014 | Yoshida et al. |
| 2014/0067174 A1* | 3/2014 | Park ..................... F16H 61/061 |
| | | 701/22 |

\* cited by examiner

VEHICLE CONTROLLING DEVICE

The present invention relates to a controlling device of a vehicle having a clutch between a drive motor and a driving wheel.

BACKGROUND ART

Patent Document 1 discloses a technique that, during a vehicle stop under a wet-clutch-slip control (hereinafter, called "WSC control") by which a vehicle travels with a clutch between a drive motor and a driving wheel being slip-controlled, corrects a point (hereinafter, called "zero point") at which the clutch starts to generate a torque capacity while step-changing a clutch pressure.

However, in a case of the technique disclosed in Patent Document 1, since the clutch pressure is changed stepwise in order to obtain the zero point, there arises a problem of taking time to detect the zero point.

An object of the present invention is therefore to provide a vehicle controlling device that is capable of quickly detect the zero point of the clutch between the drive motor and the driving wheel.

CITATION LIST

Patent Document

Patent Document 1: Japanese Unexamined Patent Application Publication No. JP2012-163117

SUMMARY OF THE INVENTION

To achieve the above object, a vehicle controlling device of the present invention comprises: a frictional engagement element provided between a drive motor and a driving wheel; a shifting unit capable of selecting a travel range or a non-travel range; a first obtaining unit configured to, during selection of the travel range, obtain a first parameter including at least a first motor torque value that is a torque value of the drive motor; a second obtaining unit configured to, during selection of the non-travel range, obtain a second parameter including at least a second motor torque value that is a torque value of the drive motor; and an operating unit configured to, on the basis of the first and second parameters, calculate a zero point hydraulic pressure command value at which the frictional engagement element starts to generate a torque capacity.

Therefore, only by obtaining each parameter during the travel range and during the non-travel range, the zero point hydraulic pressure command value can be obtained early and quickly. Further, since the motor torque value can be instantaneously calculated accurately from e.g. a motor current value, an obtaining time when obtaining parameters is short. As a consequence, an occasion to obtain these parameters can be increased, then a frequency of the learning can be increased.

EMBODIMENTS FOR CARRYING OUT THE INVENTION

[Embodiment 1]

Figure 1:
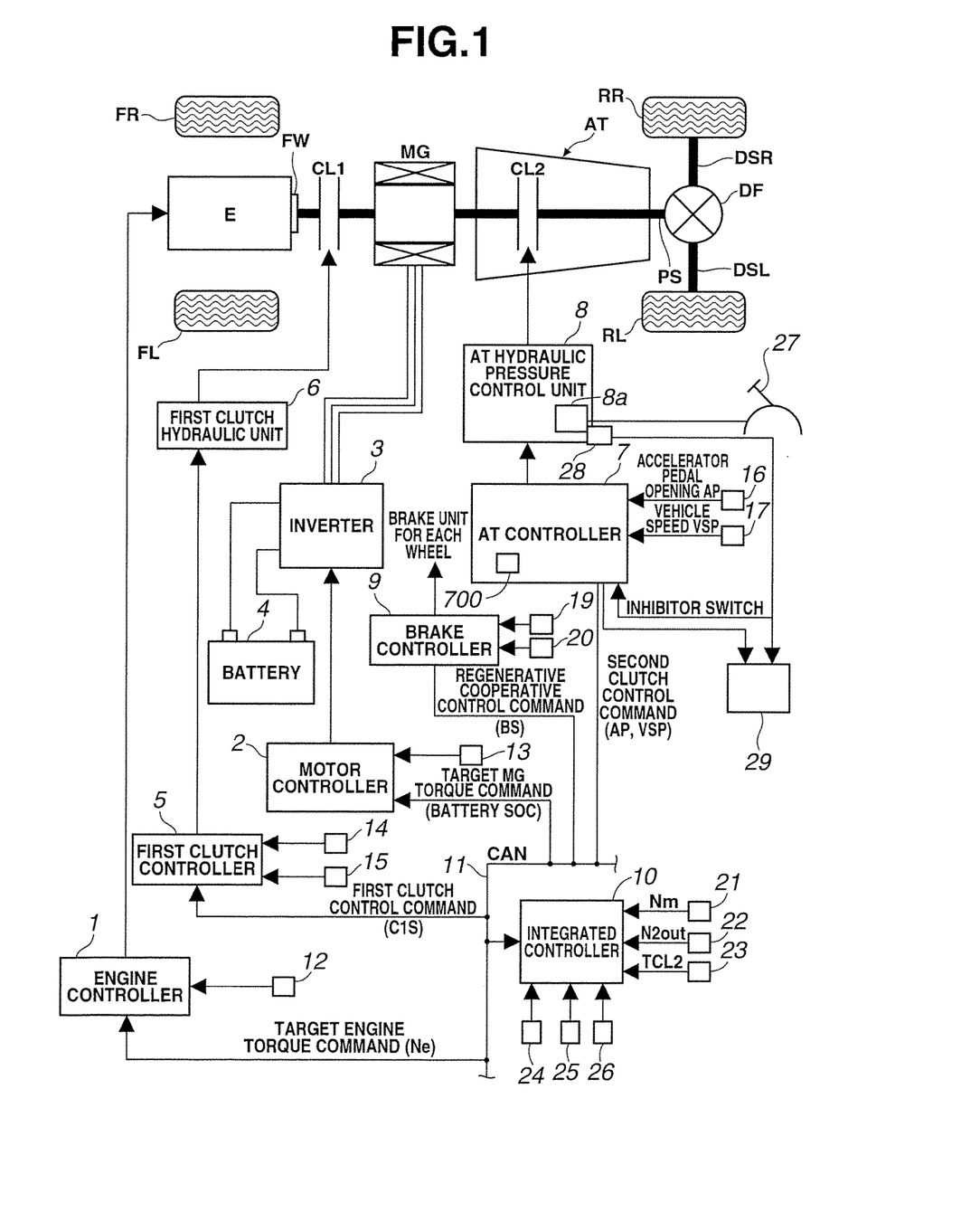
FIG. 1 is a general system diagram showing a rear-wheel-drive hybrid vehicle according to an embodiment 1.

First, a drive system of a hybrid vehicle will be explained. FIG. 1 is a general system diagram showing a rear-wheel-drive hybrid vehicle to which an engine start control device of an embodiment 1 is applied. As shown in FIG. 1, the drive system of the hybrid vehicle of the embodiment 1 has an engine E, a first clutch CL1, a motor/generator MG, a second clutch CL2, an automatic transmission AT, a propeller shaft PS, a differential gear DF, a left drive shaft DSL, a right drive shaft DSR, a rear-left wheel (driving wheel) RL and a rear-right wheel (driving wheel) RR. Here, FL is a front-left wheel, and FR is a front-right wheel.

The engine E is, for instance, a gasoline engine, and a valve opening of throttle valve etc. is controlled on the basis of a control command from an after-mentioned engine controller 1. A flywheel FW is provided at an engine output shaft.

The first clutch CL1 is a clutch that is interposed between the engine E and the motor/generator MG. Engagement and disengagement including slip-engagement of the first clutch CL1 are controlled by a control pressure produced by a first clutch hydraulic unit 6 on the basis of a control command from an after-mentioned first clutch controller 5.

The motor/generator MG is a synchronous motor/generator in which a permanent magnet is embedded in a rotor and a stator coil is wound around a stator. On the basis of a control command from an after-mentioned motor controller 2, the motor/generator MG is controlled through application of a three-phase alternating current that is generated by an inverter 3. This motor/generator MG acts as an electric motor that is driven and rotates by receiving power supply from a battery 4 (hereinafter, this state is called a power running state). Also, in a case where the rotor is rotated by an external force, the motor/generator MG acts as a generator that generates an electromotive force at both ends of the stator coil, and is able to charge the battery 4 (hereinafter, this operating state is called a regenerative state). The rotor of this motor/generator MG is connected to an input shaft of the automatic transmission AT through a damper (not shown).

The second clutch CL2 is a clutch that is interposed between the motor/generator MG and the rear-left and rear-right wheels RL and RR. Engagement and disengagement including slip-engagement of the second clutch CL2 are controlled by a control pressure that is produced by an AT hydraulic pressure control unit 8 on the basis of a control command from an after-mentioned AT controller 7.

The automatic transmission AT is a transmission that automatically changes a transmission ratio of multispeed (multistage) of, e.g. forward 5 speeds and reverse 1 speed according to a vehicle speed and/or an accelerator opening. The second clutch CL2 is not a clutch that is newly added as a special clutch, but a frictional engagement element used as one of a plurality of frictional engagement elements which are engaged in each speed or each shift stage in the automatic transmission AT. An output shaft of the automatic transmission AT is connected to the rear-left and rear-right wheels RL, RR through the propeller shaft PS as a vehicle drive shaft, the differential gear DF, the left drive shaft DSL and the right drive shaft DSR. With regard to the first and second clutches CL1 and CL2, for example, a wet multiple disc clutch whose hydraulic flow amount and hydraulic pressure can be continuously controlled by a proportional solenoid is used. The automatic transmission AT has a mechanical oil pump, and provides a hydraulic pressure to the after-mentioned AT hydraulic pressure control unit 8 according to or by rotation of the input shaft of the automatic transmission AT.

This hybrid drive system has three drive modes in accordance with a state of the engagement/disengagement of the first clutch CL1. A first drive mode is an electric vehicle drive mode (hereinafter called an EV drive mode) as a motor-used drive mode in which the first clutch CL1 is in a disengaged state and the vehicle travels by only power of the motor/generator MG as a power source. A second drive mode is an engine-used drive mode (hereinafter called an HEV drive mode) in which the first clutch CL1 is in an engaged state and the vehicle travels while including the engine E as the power source. A third drive mode is an engine-used slip drive mode (hereinafter called a WSC drive mode) in which the first clutch CL1 is in the engaged state and the second clutch CL2 is slip-controlled then the vehicle travels while including the engine E as the power source. This mode is a mode that is capable of achieving a creep drive especially when a state of charge of a battery (SOC) is low or an engine water temperature is low. Here, when changing the mode from the EV drive mode to the HEV drive mode, the first clutch CL1 is engaged, and a start of the engine E is carried out by using torque of the motor/generator MG.

With regard to the HEV drive mode, it has three drive modes; an engine drive mode, a motor assist drive mode, and a travelling power generation mode.

The engine drive mode is a mode that drives the driving wheels with only the engine E being the power source. The motor assist drive mode is a mode that drives the driving wheels with both of the engine E and the motor/generator MG being the power source. The travelling power generation mode is a mode that drives the driving wheels RL, RR with the engine E being the power source also simultaneously operates the motor/generator MG as the generator.

At a constant speed drive and an acceleration drive, the motor/generator MG works as the generator by using the power of the engine E. At a deceleration drive, by receiving a regenerative brake energy, the motor/generator MG generates the power, and this power is used to charge the battery 4.

Further, as another mode, the hybrid drive system has a power generation mode in which the motor/generator MG works as the generator at vehicle stop by using the power of the engine E.

Next, a control system of the hybrid vehicle will be explained. As shown in FIG. 1, the control system of the hybrid vehicle in the embodiment 1 has the engine controller 1, the motor controller 2, the inverter 3, the battery 4, the first clutch controller 5, the first clutch hydraulic unit 6, the AT controller 7, the AT hydraulic pressure control unit 8, a brake controller 9 and an integrated controller 10. The engine controller 1, the motor controller 2, the first clutch controller 5, the AT controller 7, the brake controller 9 and the integrated controller 10 are connected with each other through a CAN communication line 11 that allows exchange of information between them.

The engine controller 1 inputs information of an engine revolution speed (an engine rpm) from an engine rpm sensor 12, and outputs a command that controls an engine operating point (Ne: the engine revolution speed, Te: an engine torque) to, for instance, a throttle valve actuator (not shown in the drawing) in accordance with a target engine torque command etc. from the integrated controller 10. Here, information concerning the engine revolution speed Ne etc. is sent to the integrated controller 10 via the CAN communication line 11.

The motor controller 2 inputs information from a resolver 13 that detects a rotation position of the rotor of the motor/generator MG, and outputs a command that controls a motor operating point (Nm: a motor revolution speed, Tm: a motor torque) of the motor/generator MG to the inverter 3 in accordance with a target motor torque command etc. from the integrated controller 10. This motor controller 2 checks or watches the battery SOC indicating the charge state of the battery 4. The information of this battery SOC is used as control information of the motor/generator MG, and also is sent to the integrated controller 10 via the CAN communication line 11.

The first clutch controller 5 inputs sensor information from a first clutch hydraulic pressure sensor 14 and a first clutch stroke sensor 15, and outputs a command that controls the engagement/disengagement of the first clutch CL1 to the first clutch hydraulic unit 6 in accordance with a first clutch control command from the integrated controller 10. Information of a first clutch stroke C1S is sent to the integrated controller 10 via the CAN communication line 11.

The AT controller 7 inputs sensor information from an accelerator opening sensor 16, a vehicle speed sensor 17 and a second clutch hydraulic pressure sensor 23, an inhibitor switch signal from an inhibitor switch 28 that outputs a range signal corresponding to a shift position of a selecting lever 27 operated by a driver and a target second clutch torque capacity TCL2 from the integrated controller 10. The AT controller 7 has therein a shift map in which a target shift stage (or a target speed) is previously set according to a vehicle speed VSP and an accelerator pedal opening APO. The AT controller 7 calculates the target shift stage along a shift schedule indicated in the shift map, and outputs an engagement/disengagement command of the frictional engagement element for achieving the target shift stage to the AT hydraulic pressure control unit 8. In addition, the AT controller 7 calculates a second clutch hydraulic pressure command value for achieving the target second clutch torque capacity TCL2, and outputs it to the AT hydraulic pressure control unit 8. Further, the AT controller 7 has therein a second clutch learning correction controller 700, and executes a learning correction so that the second clutch hydraulic pressure command value and the second clutch torque capacity are equalized. This second clutch learning correction control will be explained later.

The AT hydraulic pressure control unit 8 controls an electromagnetic control valve according to a current command value corresponding to the engagement/disengagement command of the frictional engagement element for achieving the target shift stage. Further, the AT hydraulic pressure control unit 8 controls a second clutch electromagnetic control valve according to a current command value corresponding to the second clutch hydraulic pressure command value. With these controls, a desired control pressure is outputted to each frictional engagement element. The AT hydraulic pressure control unit 8 is provided with a manual valve 8a that operates in concert with the selecting lever 27. When the selecting lever 27 is changed from an N-range position to a D-range (or an R-rang) position, this movement is transferred to the manual valve 8a through a physical interlocking mechanism, and a spool position of the manual valve 8a is shifted from an N-range corresponding position at which a communication between a clutch source pressure (or a clutch initial pressure) and a hydraulic chamber of the second clutch CL2 is interrupted to a D-range corresponding position at which the clutch source pressure and the hydraulic chamber of the second clutch CL2 communicate with each other, thereby providing the control pressure to the second clutch CL2. Here, the accelerator pedal opening APO, the vehicle speed VSP and the inhibitor switch signal are sent to the integrated controller 10 via the CAN communication line 11. Further, the inhibitor switch signal is sent to a meter-inside indicator 29 provided in a combination meter (not shown), then a current range position is indicated.

The brake controller 9 inputs sensor information from a wheel speed sensor 19 for detecting each wheel speed of four wheels and a brake stroke sensor 20. Then, for instance, when a braking force by only a regenerative braking force is insufficient for driver's required braking force determined by a brake stroke BS upon a brake operation by driver's brake pedal depression, the brake controller 9 performs a regenerative brake cooperative control on the basis of a regenerative cooperative control command from the integrated controller 10 so that the shortage of the braking force is compensated by a mechanical braking force (a braking force by a friction brake).

The integrated controller 10 is a controller that controls a consumption energy of the whole vehicle, and performs the operation in order for the hybrid vehicle to travel at a maximum efficiency. The integrated controller 10 inputs information from a motor rotation speed sensor 21 that detects a motor rotation speed Nm (that is a rotation speed at a motor side of the second clutch CL2. Hereinafter, called an input rotation speed. A resolver 13 could be used.), a second clutch output rotation speed sensor 22 that detects a second clutch output rotation speed N2out (that is a rotation speed at a driving wheel side of the second clutch CL2. Hereinafter, called an output rotation speed.), a second clutch hydraulic pressure sensor 23 that detects an engagement pressure of the second clutch CL2, a brake hydraulic pressure sensor (a brake fluid pressure sensor) 24, a temperature sensor 25 that detects temperature of the second clutch CL2 and a G sensor 26 that detects a back-and-forth acceleration, and also inputs information obtained via the CAN communication line 11.

Further, the integrated controller 10 performs an operating control of the engine E by the control command to the engine controller 1, an operating control of the motor/generator MG by the control command to the motor controller 2, the engagement/disengagement control of the first clutch CL1 by the control command to the first clutch controller 5 and the engagement/disengagement control of the second clutch CL2 by the control command to the AT controller 7.

Figure 2:
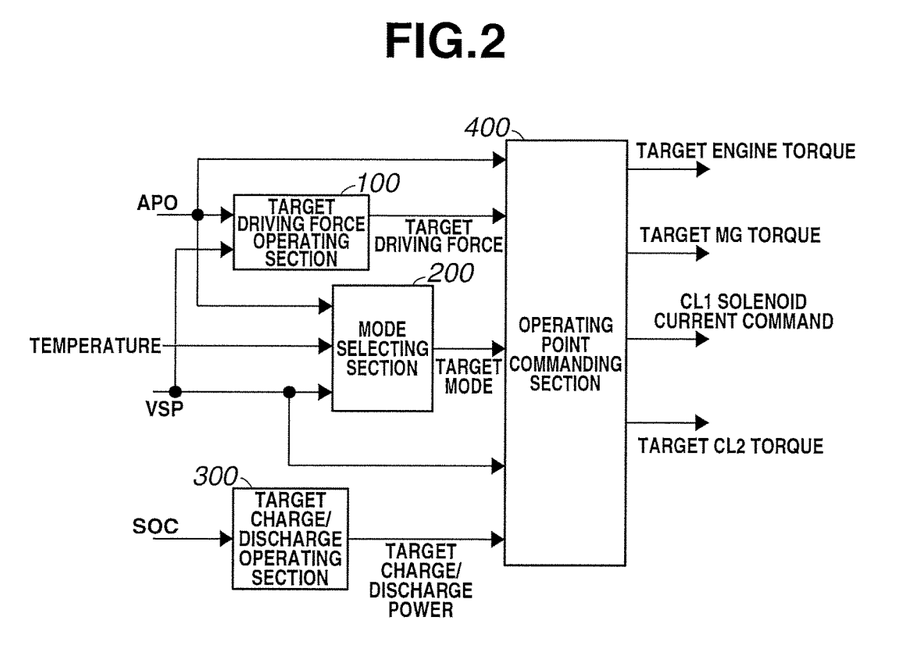
FIG. 2 is a control block diagram showing operation processes in an integrated controller according to the embodiment 1.
Figure 3:
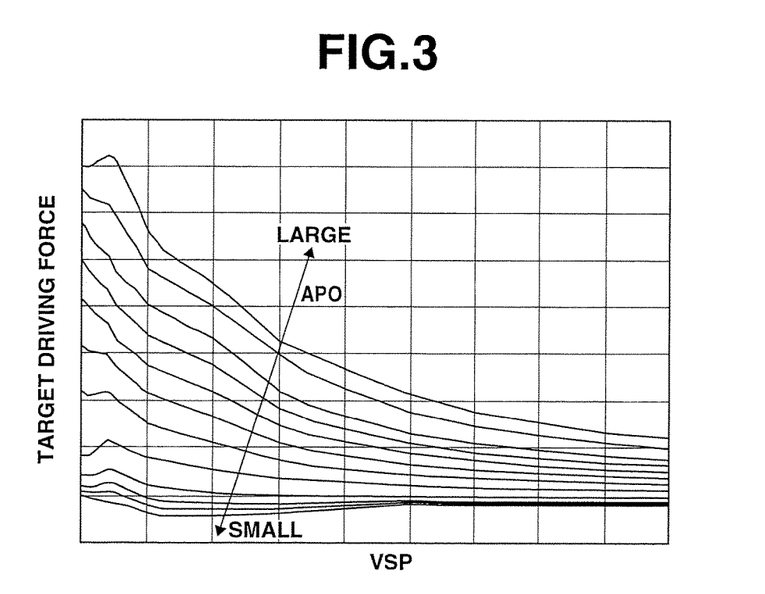
FIG. 3 is a drawing showing an example of a target driving force map used for calculation of a target driving force in a target driving force operating section of FIG. 2.

Next, control operated in the integrated controller 10 of the embodiment 1 will be explained with reference to the control block diagram in FIG. 2. The operation in the integrated controller 10 is executed for instance at a control cycle period 10 msec. The integrated controller 10 has a target driving force operating section 100, a mode selecting section 200, a target charge/discharge operating section 300 and an operating point commanding section 400. The target driving force operating section 100 calculates a target driving torque tFoO on the basis of the accelerator pedal opening APO and the vehicle speed VSP using the target driving torque map shown in FIG. 3.

Figure 4:
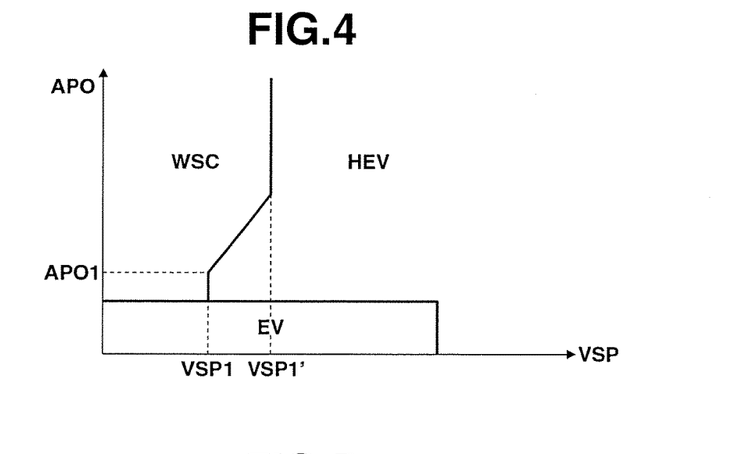
FIG. 4 is a drawing showing a normal mode map used for selection of a target mode in the mode selecting section of FIG. 2.

Next, a mode map will be explained. FIG. 4 is a normal mode map of the embodiment 1. In the normal mode map, the EV drive mode, the WSC drive mode and the HEV drive mode are set, then on the basis of the accelerator pedal opening APO and the vehicle speed VSP, the target mode is operated. However, even if the EV drive mode is selected, in a case where the battery SOC is smaller than or equal to a predetermined value, the target mode becomes the HEV drive mode compulsorily or forcibly.

In the normal mode map in FIG. 4, with regard to an HEV→WSC change line, in an area where the accelerator pedal opening APO is less than a predetermined accelerator opening APO1, the HEV→WSC change line is set in an area where the vehicle speed VSP is lower than a lower limit vehicle speed VSP1 that is a vehicle speed at which an engine rpm becomes smaller than an idle speed of the engine E when the transmission ratio of the automatic transmission AT is at a first speed. In an area where the accelerator pedal opening APO is the predetermined accelerator opening APO1 or greater, since a great driving force is required, the WSC drive mode is set up to an area of a vehicle speed VSP1' that is higher than the lower limit vehicle speed VSP1. However, this drive mode change control is configured so that when the battery SOC is low and the EV drive mode cannot be achieved, even in a case of the vehicle start, the WSC drive mode is selected.

Here, there is a case where when the accelerator pedal opening APO is large, it is difficult to achieve this request of the large accelerator pedal opening APO by the engine torque corresponding to the engine rpm around the idle speed and the torque of the motor/generator MG. Regarding the engine torque, as the engine rpm increases, more torque can be outputted. For this reason, even if the WSC drive mode is carried out up to a higher vehicle speed than the lower limit vehicle speed VSP1, by increasing the engine rpm and outputting the greater torque, the mode can change from the WSC drive mode to the HEV drive mode in a short time. This case corresponds to the WSC area that is extended or increased up to the vehicle speed VSP1' in FIG. 4.

Figure 5:
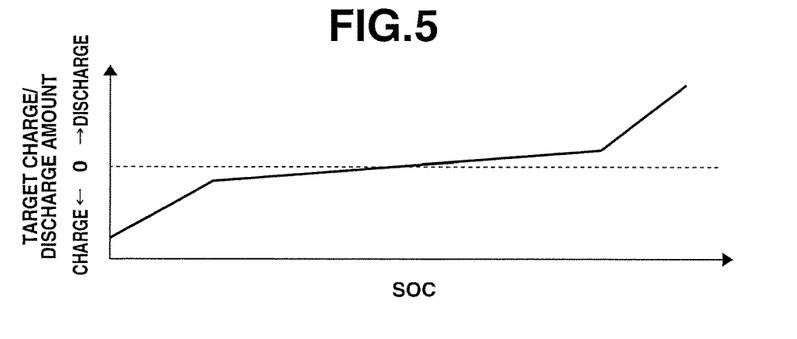
FIG. 5 is a drawing showing an example of a target charge/discharge amount map used for calculation of a target charge/discharge power in a target charge/discharge operating section of FIG. 2.

The target charge/discharge operating section 300 calculates a target charge/discharge power tP on the basis of the battery SOC using a target charge/discharge amount map shown in FIG. 5.

The operating point commanding section 400 calculates a transitional target engine torque, a transitional target motor torque, a transitional target second clutch torque capacity, a transitional target transmission ratio (a transitional target speed) of the automatic transmission AT and a transitional first clutch solenoid current command on the basis of the accelerator pedal opening APO, the target driving torque tFoO, the target mode, the vehicle speed VSP and the target charge/discharge power tP, as attainment targets of these operating points.

Further, the operating point commanding section 400 is provided with an engine start controlling section that starts the engine E when changing the mode from the EV drive mode to the HEV drive mode. The engine start controlling section brings the second clutch CL2 to a slip control state by setting the second clutch CL2 to the second clutch torque capacity corresponding to the target driving torque, performs a rotation speed control of the motor/generator MG and sets a target motor rotation speed to a value obtained by adding a predetermined slip amount to a driving wheel rotation speed corresponding value. In this state, by generating a clutch torque capacity at the first clutch CL1, the engine start controlling section carries out an engine start. With this operation, an output shaft torque becomes stable at the clutch torque capacity of the second clutch CL2. And, even when the motor rotation speed attempts to decrease due to engagement of the first clutch CL1, the motor torque is increased by the rotation speed control, and the engine start can surely be carried out.

[Second Clutch Learning Correction Control Operation]

Figure 6:
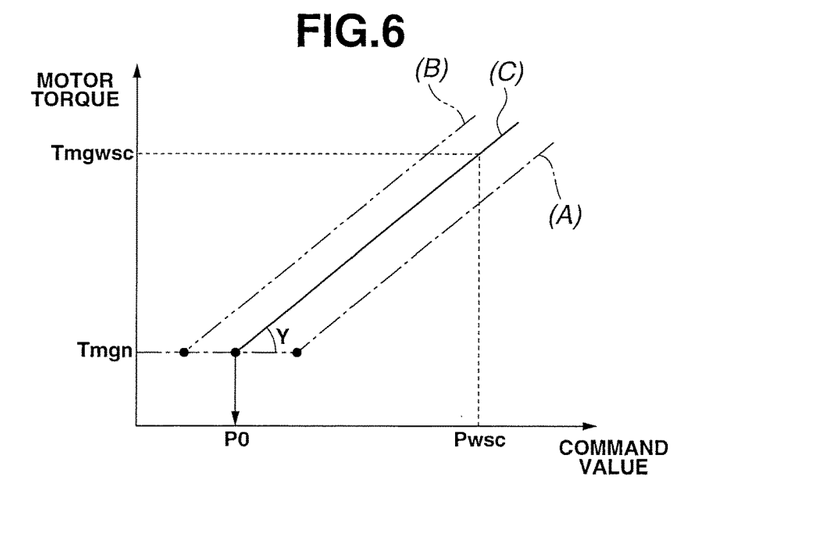
FIG. 6 is characteristics showing a relationship between a second clutch hydraulic pressure command value and a motor torque value according to the embodiment 1.

Next, operation of the second clutch learning correction control, which learns and corrects a relationship between the second clutch hydraulic pressure command value of the second clutch CL2 and the second clutch torque capacity which the second clutch CL2 actually generates, will be explained. As described above, in the WSC drive mode, the second clutch CL2 is slip-controlled. Therefore, if the relationship (hereinafter, called a second clutch torque capacity characteristic) of the second clutch torque capacity actually generated at the second clutch CL2 with the second clutch hydraulic pressure command value is shifted, a proper torque cannot be transmitted to the driving wheel, then a desired dynamics cannot be obtained. FIG. 6 is characteristics showing a relationship between the second clutch hydraulic pressure command value and a motor torque value. Here, since a characteristic of change of the motor torque value is identical with a characteristic of change of the second clutch torque capacity when the second clutch CL2 has the torque capacity, FIG. 6 will be explained with the relationship between the second clutch hydraulic pressure command value and the motor torque value being considered to substantially indicate the relationship between the second clutch hydraulic pressure command value and the second clutch torque capacity. (C) in FIG. 6 shows a relationship of the actually generated torque capacity with the command value. (A) in FIG. 6 shows a characteristic of a case where it can be recognized that a desired torque capacity can be generated by a lower command value as a characteristic of an initial setting. (B) in FIG. 6 shows a characteristic of a case where it can be recognized that a desired torque capacity can be generated by a higher command value as a characteristic of an initial setting. P0 denotes a second clutch command hydraulic pressure at an actual zero point.

For instance, in a case where a command value corresponding to the zero point is outputted with a characteristic being recognized as the characteristic (A), a command value that is higher than P0 is outputted. In this case, a higher second clutch torque capacity is generated (because an actual characteristic is the characteristic (C)), and an excessive driving torque is outputted. On the other hand, in a case where a command value corresponding to the zero point is outputted with a characteristic being recognized as the characteristic (B), a command value that is lower than P0 is outputted. In this case, the second clutch torque capacity is lower (or the second clutch CL2 does not reach the zero point), and a response becomes worse. It is assumed that the second clutch torque capacity characteristic is varied or shifted due to individual difference or secular change etc. It is especially important to properly learn the zero point that is a point at which the second clutch CL2 starts to generate the torque capacity, because this affects a start response and endurance. Therefore, in the embodiment 1, the second clutch hydraulic pressure command value at the zero point is early and quickly calculated.

The torque capacity of the second clutch CL2 is indicated by the following expression (1).

$$TCL2 = \mu \cdot 2N \cdot D/2 \cdot (P \cdot A - F)/i = \mu \cdot N \cdot D \cdot (P \cdot A - F)/i \qquad (1)$$

Here, $\mu$ is a clutch friction coefficient, N is the number of drive plates, D is a second clutch diameter, P is a second clutch hydraulic pressure, A is a pressure-receiving area of second clutch hydraulic pressure, F is a return spring reaction force, and i is a planetary gear ratio.

Here, when a clutch hydraulic pressure (a second clutch hydraulic pressure at the zero point) of a case of TCL2=0 is expressed as a second zero point hydraulic pressure command value P0, F is expressed by the following expression (2).

$$F = P0 \cdot A \qquad (2)$$

When substituting this expression (2) into the expression (1), the following expression (3) can be obtained.

$$P0 = P - Tc/(\mu \cdot N \cdot D \cdot A/i) \qquad (3)$$

Further, regarding equation of equilibrium of the motor/generator MG, when a motor torque at WSC is expressed as Tmgwsc, and a motor torque at neutral (hereinafter, called "at N") at which the second clutch CL2 is fully disengaged is expressed as Tmgn, they are expressed by the following expressions (4) and (5).

$$\text{at WSC: } Tmgwsc = Tfric\_mg + TCL2 + Tfric\_op \qquad (4)$$

$$\text{at N: } Tmgn = Tfric\_mg + Tfric\_op \qquad (5)$$

Here, Tfric_mg is a motor friction, and Tfric_op is a mechanical oil pump friction.

From the above expressions (4) and (5), TCL2 is expressed by the following expression (6).

$$TCL2 = Tmgwsc - Tmgn \qquad (6)$$

Now, when a second clutch hydraulic pressure command value at WSC is expressed as Pwsc, by substituting the expression (6) into the expression (3), the following expression (7) can be obtained.

$$P0 = Pwsc - (Tmgwsc - Tmgn)/(\mu \cdot N \cdot D \cdot A/i) \qquad (7)$$

Here, when $(\mu \cdot N \cdot D \cdot A/i)$ is expressed as Y (i.e. $(\mu \cdot N \cdot D \cdot A/i) = Y$), Y is a constant determined by specifications (or characteristics) of the vehicle.

Therefore, as shown by the expression (7), the second zero point hydraulic pressure command value P0 at zero point can be calculated from the second clutch hydraulic pressure command value Pwsc at WSC, the motor torque Tmgwsc at this time and the motor torque Tmgn obtained at N. In other words, as shown by the characteristic (C) in FIG. 6, since a gradient of the characteristic is defined by Y, the characteristic is determined by the motor torque Tmgwsc corresponding to Pwsc. A command value corresponding to Tmgn on this characteristic is the second zero point hydraulic pressure command value P0 at the zero point, then the second zero point hydraulic pressure command value P0 can be instantaneously calculated by reverse operation. Therefore, in the embodiment 1, the second zero point hydraulic pressure command value P0 at the zero point is calculated by the operation. Further, since the motor torque value can be instantaneously calculated accurately from e.g. a motor current value, an obtaining time when obtaining parameters such as Tmgwsc and Tmgn is short. As a consequence, an occasion to obtain these parameters can be increased, then a frequency of the learning can be increased.

Figure 7:
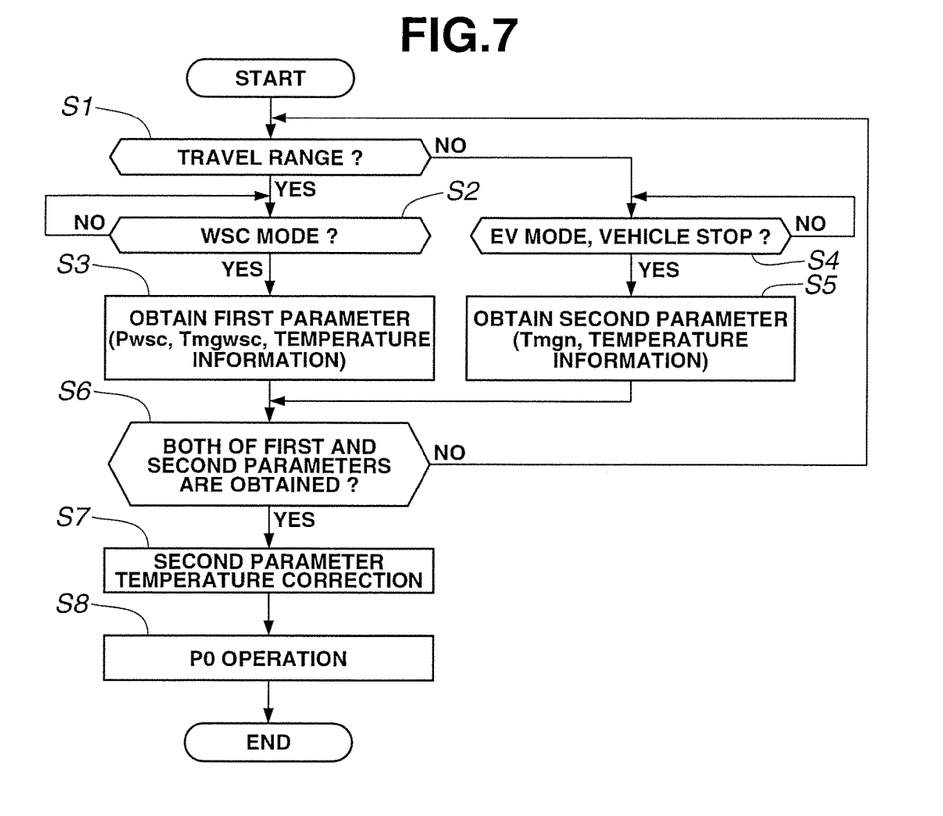
FIG. 7 is a flow chart showing a second clutch learning correction control according to the embodiment 1.

FIG. 7 is a flow chart showing the second clutch learning correction control of the embodiment 1.

At step S1, a judgment is made as to whether or not a current range is a travel range (D-range or R-rang). When the current range is the travel range, the routine proceeds to step S2. When the current range is a non-travel range (N-range or P-range), the routine proceeds to step S4.

At step S2, a judgment is made as to whether or not a current mode is in the WSC mode. When the current mode is in the WSC mode, the routine proceeds to step S3. When the current mode is a mode except the WSC mode, this step is repeated.

At step S3, a second clutch temperature temp_wsc, Pwsc and Tmgwsc (hereinafter, each of these information is called a first parameter) are obtained.

At step S4, a judgment is made as to whether or not the vehicle is in the EV mode and also in a vehicle stop state by brake-ON (hereinafter, called a non-travel range-time learning condition). When the non-travel range-time learning condition is met, the routine proceeds to step S5. When the non-travel range-time learning condition is not met, this step is repeated.

At step S5, a second clutch temperature temp_n and Tmgn when rotating the motor/generator MG with the second clutch CL2 being in a fully disengaged state (hereinafter, each of these information is called a second parameter) are obtained.

At step S6, a judgment is made as to whether or not both of the first and second parameters are obtained. When both of the first and second parameters are obtained, the routine proceeds to step S7. When both of the first and second parameters are not obtained, the routine is returned to step S1.

Figure 8:
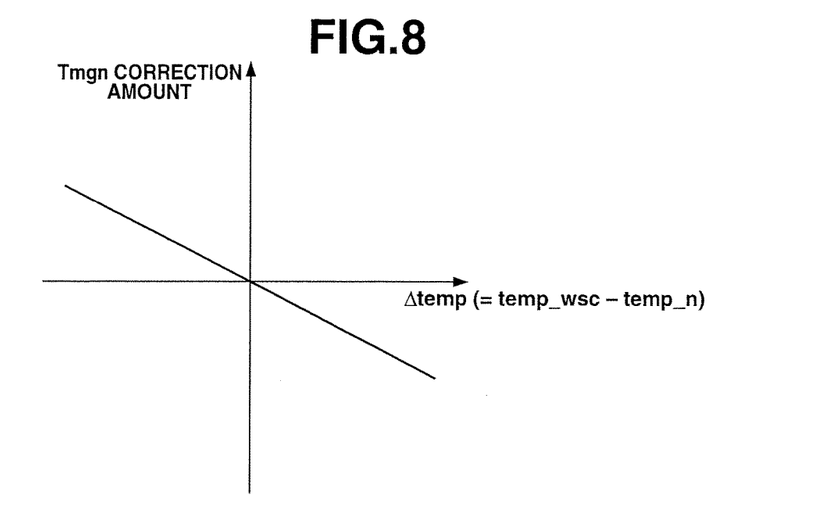
FIG. 8 is a Tmgn correction amount map according to the embodiment 1.

At step S7, a correction amount of Tmgn is calculated on the basis of a difference between temp_wsc and temp_n, and Tmgn is corrected. FIG. 8 is a Tmgn correction amount map of the embodiment 1. Δ temp is a value obtained by subtracting temp_n from temp_wsc. When the Δ temp is a positive value, the second clutch temperature at N that is a time when the second parameter is obtained is lower than that at WSC that is a time when the first parameter is obtained. In this case, viscous drag of oil is large, and the motor friction and the mechanical oil pump friction become large. Thus, a subtraction correction is made by subtracting an amount equivalent to these viscous drag and friction from Tmgn. On the other hand, when the Δ temp is a negative value, the second clutch temperature at N that is the time when the second parameter is obtained is higher than that at WSC that is the time when the first parameter is obtained. In this case, the viscous drag of oil is small, and the motor friction and the mechanical oil pump friction become small. Thus, an addition correction is made by adding an amount equivalent to these viscous drag and friction to Tmgn. In this manner, by correcting a value obtained at a timing of a different temperature environment or condition as a value obtained in the same temperature environment or condition, a highly accurate P0 can be obtained.

At step S8, P0 is calculated on the basis of Pwsc, Tmgwsc and a corrected Tmgn.

The embodiment 1 brings the following effects (1) A vehicle controlling device comprises: a second clutch CL2 (a frictional engagement element) provided between a motor/generator MG (a drive motor) and a driving wheel; a selecting lever 27 (a shifting unit) capable of selecting a travel range or a non-travel range; step S3 (a first obtaining unit) configured to, during selection of the travel range, obtain a first parameter including at least Tmgwsc (a first motor torque value) that is a torque value of the motor/generator MG; step S5 (a second obtaining unit) configured to, during selection of the non-travel range, obtain a second parameter including at least Tmgn (a second motor torque value) that is a torque value of the motor/generator MG; and step S8 (an operating unit) configured to, on the basis of the first and second parameters, calculate a zero point hydraulic pressure command value P0 at which the second clutch CL2 starts to generate a torque capacity.

Therefore, only by obtaining each parameter during the travel range and during the non-travel range, the zero point hydraulic pressure command value P0 can be instantaneously obtained, and the zero point hydraulic pressure command value P0 of the second clutch CL2 can be obtained early and quickly. Further, since the motor torque value can be instantaneously calculated accurately from e.g. a motor current value, an obtaining time when obtaining parameters such as Tmgwsc and Tmgn is short. As a consequence, an occasion to obtain these parameters can be increased, then a frequency of the learning can be increased.

(2) In step S3, as the first parameter, Tmgwsc that is a motor torque value at WSC mode at which the second clutch CL2 is slip-controlled is obtained and also Pwsc that is a hydraulic pressure command value for the second clutch CL2 when the Tmgwsc is obtained is obtained And, in step S5, as the second parameter, Tmgn that is a motor torque value at N when the second clutch CL2 is disengaged is obtained.

That is, if the second clutch CL2 is in slip-controlled state, a correlation between a torque value which the motor/generator MG generates and the second clutch torque value is extremely high. And if the second clutch CL2 is fully disengaged, a correlation between a torque value which the motor/generator MG generates and each friction is extremely high. Therefore, an accurate zero point hydraulic pressure command value P0 can be obtained.

(3) In step S3, as the first parameter, a second clutch temperature temp_wsc (a first temperature value) when Tmgwsc is obtained is obtained.

And, in step S5, as the second parameter, a second clutch temperature temp_n (a second temperature value) when Tmgn is obtained is obtained.

And, in step S7, when the temp_n is different from temp_wsc, Tmgn is corrected on the basis of a difference Δ temp between temp_n and temp_wsc, and the zero point hydraulic pressure command value P0 is calculated on the basis of the corrected Tmgn.

Therefore, even if the first parameter and the second parameter are obtained in a different temperature environment or condition, by correcting them as a value obtained in the same temperature environment or condition, an accurate zero point hydraulic pressure command value P0 can be obtained.

[Other Embodiments]

Although the present invention is explained on the basis of the embodiment 1, a specific configuration could be other configurations. For instance, in the embodiment 1, a case of the FR-type hybrid vehicle is explained. However, it could be an FF-type hybrid vehicle.

Further, in the embodiment 1, a case of the hybrid vehicle having the engine and the motor/generator is explained. However, the present invention can also be applied to an electric vehicle whose driving source is only a motor. Also in this case, the same operation and effects as those of the embodiment 1 can be obtained.

In addition, in the embodiment 1, the second parameter is obtained in the WSC mode. However, the slip-control of the second clutch CL2 could be carried out in a mode except the WSC mode.

Moreover, although the multi-range transmission is described as the automatic transmission as an example, it could be a continuously variable transmission.

The invention claimed is:

1. A vehicle controlling device comprising:
a frictional engagement element provided between a drive motor and a driving wheel;
a shifting unit capable of selecting a travel range or a non-travel range;
a first obtaining unit configured to, during selection of the travel range, obtain a first parameter including at least a first motor torque value that is a torque value of the drive motor;
a second obtaining unit configured to, during selection of the non-travel range, obtain a second parameter including at least a second motor torque value that is a torque value of the drive motor; and
an operating unit configured to, using the first and second motor torque values, calculate a zero point hydraulic pressure command value which is a hydraulic pressure command value at which the frictional engagement element starts to generate a torque capacity.

2. The vehicle controlling device as claimed in claim 1, wherein:
the first obtaining unit is configured to obtain, as the first parameter, the first motor torque value when the frictional engagement element is slip-controlled and a hydraulic pressure command value for the frictional engagement element when the first motor torque value is obtained, and
the second obtaining unit is configured to obtain, as the second parameter, the second motor torque value when the frictional engagement element is disengaged.

3. The vehicle controlling device as claimed in claim 1, wherein:
the first obtaining unit is configured to obtain, as the first parameter, a first temperature value corresponding to a temperature during the travel range when the first motor torque value is obtained,
the second obtaining unit is configured to obtain, as the second parameter, a second temperature value corresponding to a temperature during the non-travel range when the second motor torque value is obtained, and
the operating unit is configured to, when the second temperature value is different from the first temperature value, correct the second motor torque value on the basis of a difference between the second temperature value and the first temperature value, and calculate the zero point hydraulic pressure command value on the basis of the corrected second motor torque value.

4. A vehicle controlling device comprising:
a clutch provided between a drive motor and a driving wheel;
a shifter capable of selecting a travel range or a non-travel range; and
a controller configured to
during selection of the travel range, obtain a first parameter including at least a first motor torque value that is a torque value of the drive motor;
during selection of the non-travel range, obtain a second parameter including at least a second motor torque value that is a torque value of the drive motor; and
using the first and second motor torque values, calculate a zero point hydraulic pressure command value which is a hydraulic pressure command value at which the clutch starts to generate a torque capacity.

5. The vehicle controlling device as claimed in claim 4, wherein the controller is further configured to:
obtain, as the first parameter, the first motor torque value when the clutch is slip-controlled and a hydraulic pressure command value for the clutch when the first motor torque value is obtained, and
obtain, as the second parameter, the second motor torque value when the clutch is disengaged.

6. The vehicle controlling device as claimed in claim 4, wherein the controller is further configured to:
obtain, as the first parameter, a first temperature value corresponding to a temperature during the travel range when the first motor torque value is obtained,
obtain, as the second parameter, a second temperature value corresponding to a temperature during the non-travel range when the second motor torque value is obtained, and
when the second temperature value differs from the first temperature value, correct the second motor torque value on the basis of a difference between the second temperature value and the first temperature value, and calculate the zero point hydraulic pressure command value on the basis of the corrected second motor torque value.

* * * * *